(12) United States Patent
Provost et al.

(10) Patent No.: US 7,516,524 B2
(45) Date of Patent: Apr. 14, 2009

(54) HOOK FASTENER COMPONENTS AND METHODS OF THEIR MANUFACTURE

(75) Inventors: George A. Provost, Litchfield, NH (US); Mark A. Clarner, Concord, NH (US); David P. Kraus, Amherst, NH (US)

(73) Assignee: Velcro Industries B.V., Curacao (NL)

(*) Notice: Subject to any disclaimer, the term of this patent is extended or adjusted under 35 U.S.C. 154(b) by 0 days.

(21) Appl. No.: 11/078,174

(22) Filed: Mar. 11, 2005

(65) Prior Publication Data

US 2006/0200951 A1   Sep. 14, 2006

(51) Int. Cl.
*A44B 18/00* (2006.01)

(52) U.S. Cl. .................................................. 24/452
(58) Field of Classification Search .............. 24/452; 428/100
See application file for complete search history.

(56) References Cited

U.S. PATENT DOCUMENTS

| | | | |
|---|---|---|---|
| 3,557,407 A * | 1/1971 | Lemelson | ............ 425/71 |
| 4,189,809 A | 2/1980 | Sotos | |
| 4,794,028 A | 12/1988 | Fischer | |
| 4,872,243 A | 10/1989 | Fischer | |
| 4,984,339 A | 1/1991 | Provost et al. | |
| 5,067,210 A | 11/1991 | Keyaki | |
| 5,116,563 A | 5/1992 | Thomas et al. | |
| 5,131,119 A | 7/1992 | Murasaki et al. | |
| 5,144,786 A | 9/1992 | Pacione | |
| 5,180,534 A | 1/1993 | Thomas et al. | |
| 5,230,851 A | 7/1993 | Thomas | |
| 5,235,731 A | 8/1993 | Anzai et al. | |
| 5,315,740 A | 5/1994 | Provost | |
| 5,318,741 A | 6/1994 | Thomas | |
| 5,325,569 A | 7/1994 | Goulait et al. | |
| 5,385,706 A | 1/1995 | Thomas | |
| 5,392,498 A | 2/1995 | Goulait et al. | |
| 5,540,673 A | 7/1996 | Thomas et al. | |
| 5,551,130 A | 9/1996 | Tominaga et al. | |
| 5,604,963 A | 2/1997 | Akeno | |
| 5,620,769 A | 4/1997 | Wessels et al. | |
| 5,625,930 A * | 5/1997 | Takizawa et al. | .......... 24/452 |
| 5,657,517 A | 8/1997 | Akeno et al. | |
| 5,685,050 A | 11/1997 | Murasaki | |
| 5,692,271 A | 12/1997 | Provost et al. | |
| 5,702,797 A | 12/1997 | Sakakibara et al. | |
| 5,720,740 A * | 2/1998 | Thomas | ............ 604/391 |
| 5,781,969 A | 7/1998 | Akeno et al. | |
| 5,839,172 A * | 11/1998 | Takizawa et al. | .......... 24/452 |
| 5,857,527 A | 1/1999 | Van Vuuren | |
| 5,884,374 A | 3/1999 | Clune | |
| 5,887,320 A | 3/1999 | Provost | |

(Continued)

FOREIGN PATENT DOCUMENTS

| | | |
|---|---|---|
| CA | 2160057 | 4/1996 |
| EP | 0 421 295 | 2/1994 |
| EP | 0 381 087 | 3/1994 |
| EP | 0 464 753 | 10/1994 |
| EP | 0 464 754 | 11/1994 |

(Continued)

*Primary Examiner*—Robert J Sandy
(74) *Attorney, Agent, or Firm*—Fish & Richardson P.C.

(57) ABSTRACT

A molded plastic hook fastener component for hook and loop fastening has individual raised bases distributed over a common area, each carrying an individual hook element while a laterally contiguous portion of each raised base raises the lower bound for the loop region beneath the fastener head. During molding, fastener elements are pulled from their mold cavities through cavity portions of the raised bases.

28 Claims, 5 Drawing Sheets

U.S. PATENT DOCUMENTS

| | | | |
|---|---|---|---|
| 5,900,350 A | 5/1999 | Provost et al. | |
| 6,063,067 A * | 5/2000 | Takizawa et al. | 604/386 |
| 6,131,251 A | 10/2000 | Provost | |
| 6,163,939 A | 12/2000 | Lacey et al. | |
| 6,224,807 B1 | 5/2001 | Clune | |
| 6,671,935 B2 * | 1/2004 | Filion et al. | 24/452 |
| D516,952 S * | 3/2006 | Kingsford et al. | D11/200 |
| 2001/0052170 A1 * | 12/2001 | Aamodt et al. | 24/452 |
| 2003/0121128 A1 * | 7/2003 | Vanbenschoten et al. | 24/452 |
| 2004/0194262 A1 | 10/2004 | Kurtz et al. | |

FOREIGN PATENT DOCUMENTS

| | | |
|---|---|---|
| EP | 0 567 103 | 7/1997 |
| EP | 0 641 528 | 10/1999 |
| EP | 0 714 614 | 3/2000 |
| EP | 0 711 518 | 9/2001 |
| EP | 0 709 038 | 3/2002 |
| EP | 0 811 331 | 1/2003 |
| GB | 1372536 | 10/1974 |
| WO | WO94/22338 | 10/1994 |
| WO | WO99/60881 | 12/1999 |

* cited by examiner

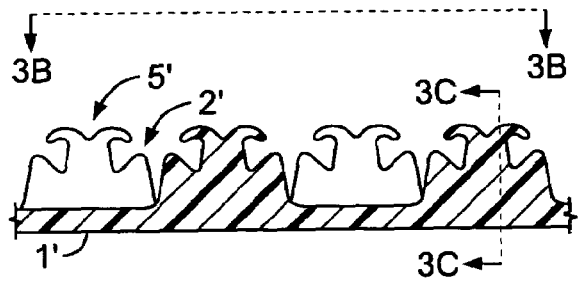
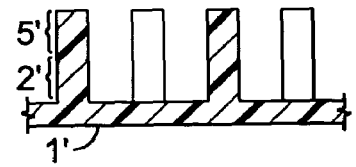
FIG. 3A      FIG. 3C
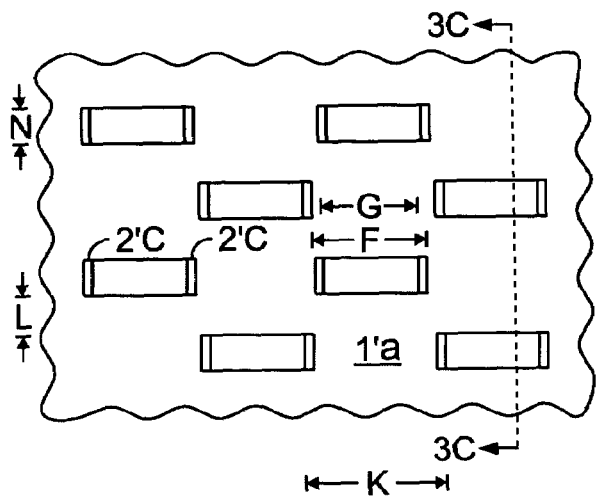
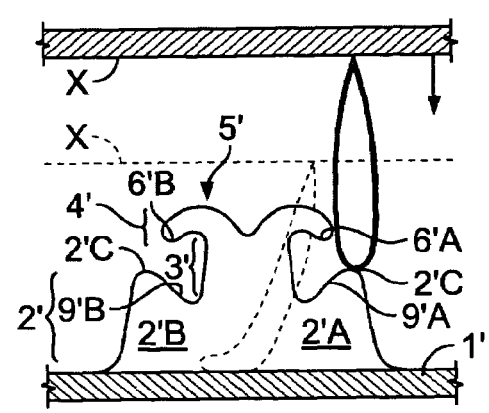
FIG. 3B      FIG. 3
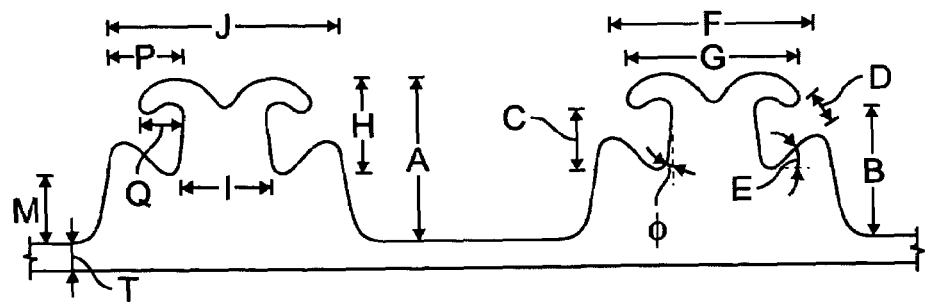
FIG. 3D

HOOK FASTENER COMPONENTS AND METHODS OF THEIR MANUFACTURE

TECHNICAL FIELD

This invention concerns improvements in hook components for hook and loop fastening and in manufacture of the hook components.

BACKGROUND

For engaging hook and loop components of a fastener, an array of fastener hook elements formed on a common supporting member is pressed face-wise against a field of loops. The quality of the fastening is judged principally by its peel and shear strengths, strengths that are affected by many aspects of the design. Of particular concern are the number of hook elements present, the probability that each given hook element will be engaged in a loop, and the amount of resistance provided by that hook element before it deflects sufficiently to release the loop. These aspects are interrelated.

The probability of engagement of a given fastener hook element with a loop generally increases with the depth of penetration of the hook elements into the loop material. This depth of penetration is dependent upon the maximum penetration depth permitted by the overall hook component, ordinarily set by the height of its hook elements, and upon the frontal resistance to penetration. This frontal resistance is determined by the size of the frontal profile ("foot print") of the individual hook elements confronting the loop material and by the areal density of the hook elements on the hook component.

The degree of resistance offered by a hook element to disengagement from a loop concerns the force required to bend the hook element sufficiently that the loop slips from the hook head. For hook elements that are otherwise the same, the taller the stem of the hook element in the plane of loading, the more easily it is bent to release the loop, hence the weaker its engagement with a loop. Similarly, the shorter the stem, the more resistance it offers to such loop release.

A hook element formed by a stem and an overhanging hook head typically has a directional quality that affects its resistance to disengagement. When the loop is pulled in the direction against the stem of the hook element, the hook element resists disengagement more effectively than when it is pulled in the opposite direction, away from the stem. Where resistance to unfastening against motions in both directions is desired, each fastener element may be provided with head portions that protrude in opposite directions. Alternatively, single direction hook elements that are closely adjacent may be oriented in opposite directions, decreasing the frontal area of each hook element, but requiring more fastener elements for similar strength properties. Hook components of these kinds may be designed especially for strength in the plane that includes the height of the fastener elements and their heads. It is usually desirable that the fastener elements also have significant strength in the orthogonal plane that includes the height of the elements, because some fraction of loading may occur in that plane.

There are other hook-loop performance criteria recognized in the field. As well, the conditions of use affect performance, for example, shifts can occur between joined components during normal use of a product, altering the relationship between loops and the hook elements, to bring more or fewer loops under hook heads.

Furthermore, a hook design, to be practicable, must also satisfy concerns about manufacturability, durability of tooling and cost of manufacture.

In the face of demands for less expense and better performance, a significant challenge confronts any attempt to improve hook fastener components. Such demands occur in particular for mass-produced, disposable products such as infant care products, personal care and medical products and packaging. In such products, the loop component is formed of inexpensive nonwoven materials which are typically difficult to engage satisfactorily with fastener hooks. Nonwoven loop materials are constructed, for instance, of a layer of fibers or filaments that have relatively raised or lofty loop regions between regions secured by adhesives or self-adhesive bonds. There is particular need in these cases for the hook component to be low-cost while having dependable fastening properties.

SUMMARY

Though the number of loops that enter beneath hook heads depends upon depth of penetration of the hook heads into a loop material, still, in general, we have realized that the more distant a loop resides below a hook head, the less is the chance for it to be engaged by the hook head when forces are applied that tend to disengage the fastening. It is realized that this negative effect can be avoided by providing a locally, substantially raised surface beneath the individual hook overhang. This provides, locally, a substantially higher lower bound (bottom) to the loop entry region beneath the hook head than exists for loops in the space laterally beyond the individual raised surface. In effect this confines loops closer to the hook head than would otherwise occur, increasing the probability of engagement of a loop about the tip of the hook head. It is also realized that an apparently competitive relationship between need for hook element height to achieve depth of penetration into a loop material, and need for less hook element height to enhance the resistance of the hook element to bending, can be overcome by locally, substantially raising the effective base level from which each hook element extends. In this manner the stems of the hook elements can be relatively shorter, hence the hook elements stiffer, without unduly limiting depth of overall penetration of the hook elements into the loop material. Moreover, it is realized that a raised localized base for an individual fastener element can simultaneously provide both of the desired effects, i.e. raising the lower bound of the region under the head overhang of the fastener element and enabling shortening of the relative height of the effective stem of the fastener element. It is further realized that this construction enables relative smallness of the hook heads which facilitates penetration into the loop material. Because the raised base for an individual fastener element lies substantially beneath the hook head, it is masked from contributing significantly to frontal resistance to penetration into loop material. In providing the individual raised bases, it is further realized that by suitable shaping of the surfaces bounding the loop region beneath the overhanging head portion (i.e. the upper surface of the base and the exposed surface of the stem), this loop region can be made to extend laterally inwardly from the tip of the head, against the stem at the base where the hook element is strongest against bending.

It is realized that at least a slight depression adjacent the respective stem can aid in retention of a loop under a head portion.

It is further realized that by suitable shaping of the upper surface of each raised base, a favorable loop-deflecting action can be obtained as the fastener components engage. For example, the upper surface of the raised base may be inclined downwardly toward the stem to deflect and direct loops into the loop entry region beneath the hook head. Further, by slightly extending the raised base laterally beyond the overhanging tip of the hook head, the loop-deflecting surface can encounter and direct additional loops into the-loop region under the head overhang. In such construction, closeness of the base surface beneath the hook tip can constrain loops to pass near the hook tip, increasing the likelihood of engagement of the hook tip in the loop, while downward incline of the base surface from there, toward the stem, can provide a secure residence for loops near the stem of the hook element at the base where the hook element is strongest in resistance to bending.

It is realized that these favorable effects may be obtained without requiring the fastener elements to be thickened in a lateral direction orthogonal to the direction of head overhang. Besides facilitating penetration into the loop material, this enables use of simple tooling. In particular, it is realized that the features described are readily adaptable to existing manufacturing techniques, and, in some respects, can improve the techniques. Designs according to the principles described are readily adaptable to the Fischer and Kennedy, et al. fixed mold techniques (see e.g. U.S. Pat. Nos. 4,872,243 and 5,260,015). The adjacent mold cavity portions for the individual raised base, its deflecting surface, and the individual fastener element can all be defined in a single mold plate or tool ring, the cavity closed on its sides by plain surfaces of adjoining members.

Further, it is realized that the enlarged region of the mold occupied by the individual raised bases provide early relief for the hook head from distortion that necessarily occurs in demolding the hook elements. This enables better restoration of the hook elements to design contour following demolding.

Based at least in part on one or more of these realizations, one aspect of the invention features a hook component for hook and loop fastening that includes a laterally-extending common portion of thermoplastic resin, and a pattern of individual, substantially raised bases distributed over an area of the common portion and formed of thermoplastic resin integral with resin of the common portion. Each raised base carries an individual fastener element and being spaced laterally from other raised bases and their fastener elements, such that loop space extending to the common portion substantially surrounds each raised base and its fastener element. Each fastener element is formed of thermoplastic resin integral with resin of the respective raised base and comprises an upwardly projecting stem and a head that is joined to the stem. The head extends laterally beyond the stem in at least one direction to provide a loop-engageable overhanging portion that ends in a tip. The lower end of the stem is joined to one portion of the respective raised base, a substantial, laterally contiguous portion of the raised base lying beneath the overhanging portion of the respective head, forming a lower bound to a loop region lying immediately beneath the overhanging portion of the fastener element.

The height of a raised base relative to the common portion is preferably between about 40 and 100 percent of the height of the respective fastener element above its raised base.

In some cases, the distance between the tip of the overhanging head portion and the nearest portion of the upper surface of the respective raised base is less than about 50 percent of the elevation of the tip relative to the common portion that lies laterally beyond the raised base.

In some embodiments, the surfaces of the fastener element and the raised base are shaped to position a part of the loop region laterally inwardly of the tip toward the stem, preferably the surface of the stem exposed to the loop region being inclined no more than about 30 degrees to perpendicular to the lateral direction, locating the stem in a substantially laterally recessed relation to the tip of the head portion.

The upper surface of a raised base has, in some examples, at least a slight depression adjacent the respective stem.

The upper surface of a raised base is positioned and shaped to deflect loops toward the stem of the respective fastener element when the hook component moves face-wise against a loop material, preferably the upper surface of the raised base being inclined downwardly in the direction of the respective stem with an angle of inclination between about 10 and 60 degrees relative to the lateral direction.

Each raised base and the stem supported by it may be together molded of thermoplastic resin. The head and stem of each fastener element may be together molded of thermoplastic resin. As a result of being molded in a mold cavity closed on opposite sides by planar surfaces, the stem of each fastener element and the respective raised base may have co-planar side surfaces.

In some examples, overhanging head portions of a fastener element project substantially in two opposite lateral directions, such that each overhanging portion overlies a portion of the respective raised base. Raised upper surfaces of these portions of the raised base forming lower bounds to loop regions lie below the overhanging head portions of the fastener element. Preferably the fastener elements is substantially of molded, palm tree form.

In the plane of the overhanging head portion of a fastener element having head portions projecting in opposite lateral directions, the width of the respective raised base is preferably at least 60 percent wider, for some applications, than the width of the stem at the raised base.

In some embodiments the fastener element has only one overhanging head portion. The hook component may be comprised of adjacent rows of the fastener elements, in which the fastener elements of one row have overhanging head portions, all of which project over portions of their respective raised bases in one lateral direction, the fastener elements of an adjacent row having overhanging head portions, all of which project over portions of their respective raised bases in the opposite lateral direction.

In some cases, the width of the respective raised base, in the plane of the overhanging head portion of a fastener element having only one overhanging head portion, is at least 45 percent wider than the width of the stem at the raised base.

In some examples the hook component has a loop material-penetrating profile defined substantially entirely by the heads of the fastener elements, the area of the heads occupying between about 10 and 25 percent of the respective area of the hook component.

Another aspect of the invention features a hook component for hook and loop fastening that includes a laterally-extending common portion of thermoplastic resin, and a pattern of individual, substantially raised bases distributed over an area of the common portion and formed of thermoplastic resin integral with resin of the common portion. Each raised base carries an individual fastener element and is spaced laterally from other raised bases and their fastener elements, such that loop space extending to the common portion substantially surrounds each raised base and its fastener element. Each fastener element is formed of thermoplastic resin integral with resin of the respective raised base and comprises an upwardly projecting stem and a head that is joined to the stem, the head extending laterally beyond the stem in at least one direction to provide a loop-engageable overhanging portion that ends in a tip. The lower end of the stem is joined to one portion of the respective raised base, a substantial, laterally contiguous portion of the raised base lying beneath the overhanging portion of the respective head, forming a lower bound to a loop region lying immediately beneath the overhanging portion of the fastener element. The height of the raised base relative to the common portion is between about 40 and 100 percent of the height of the respective fastener element above its raised base, the surfaces of the fastener element and the raised base being shaped to position a part of the loop region laterally inwardly of the tip toward the stem. Overhanging head portions of the fastener element project substantially in two opposite lateral directions, each overhanging head portion overlying a portion of the respective raised base. Raised upper surfaces of these portions of the raised base form lower bounds to loop regions lying below the overhanging head portions of the fastener element. In the plane of the overhanging head portion of the fastener element, the width of the respective raised base is at least 60 percent wider than the width of the stem at the raised base.

Another aspect of the invention features a hook component for hook and loop fastening that includes a laterally-extending common portion of thermoplastic resin, and a pattern of individual, substantially raised bases distributed over an area of the common portion and formed of thermoplastic resin integral with resin of the common portion. Each raised base carries an individual fastener element and is spaced laterally from other raised bases and their fastener elements, such that loop space extending to the common portion substantially surrounds each raised base and its fastener element. Each fastener element is formed of thermoplastic resin integral with resin of the respective raised base and comprises an upwardly projecting stem and a head that is joined to the stem, the head extending laterally beyond the stem in at least one direction to provide a loop-engageable overhanging portion that ends in a tip. The lower end of the stem is joined at a root region to one portion of the respective raised base, a substantial, laterally contiguous portion of the raised base lying beneath the overhanging portion of the respective head, forming a lower bound to a loop region lying immediately beneath the overhanging portion of the fastener element. The height of the raised base relative to the common portion is between about 40 and 100 percent of the height of the respective fastener element above its raised base. The surfaces of the fastener element and the raised base are shaped to position a part of the loop region laterally inwardly of the tip toward the stem, the fastener element having only one overhanging head portion. In the plane of the overhanging head portion of the fastener element, the width of the respective raised base is at least 45 percent wider than the width of the stem at the raised base.

In some embodiments suitable for engagement in the loops of selected nonwoven loop material, the fastener elements have a height above their respective raised bases less than about 0.015 inch or 0.010 inch.

In some examples, a lateral extremity of a laterally contiguous portion of the raised base lies a distance from the stem of the fastener no greater than 175 percent of the distance at which the tip of the overhanging head portion lies from the stem.

Another aspect of the invention features a hook component for hook and loop fastening that includes a laterally-extending common portion and a pattern of individual, substantially raised bases distributed over an area of the common portion. Each raised base carries an individual fastener element and is spaced laterally from other raised bases and their fastener elements such that loop space extending to the common portion substantially surrounds each raised base and its fastener element. Each fastener element comprises an upwardly projecting stem and a head that is joined to the stem, the head extending laterally beyond the stem in at least one direction to provide a loop-engageable overhanging portion that ends in a tip. The lower end of the stem is joined to one portion of the respective raised base, a substantial, laterally contiguous portion of the raised base lying beneath the overhanging portion of the respective head, forming a lower bound to a loop region lying immediately beneath the overhanging portion of the fastener element. The contiguous portion of the raised base extends beyond the stem of its respective fastener element to a lateral extremity, the lateral extremity of the raised base lying a distance from the stem of the fastener no greater than 175 percent of the distance at which the tip of the overlying head portion lies from the stem.

Another aspect of the invention features a method of forming a hook component for hook and loop fastening having any of the features described above. The method includes providing a mold defining an array of fixed mold cavities having cavity portions shaped to form the raised bases, and contiguous, deeper cavity portions shaped to form the fastener elements. The mold cavities are filled with thermoplastic resin while providing a laterally extending common portion of the resin lying over the entries of all of the mold cavities and over an exposed surface of the mold extending between the cavities. The resin is cooled until the shapes of the bases and fastener elements are formed, and then the hook component is demolded, including drawing the fastener elements through the cavity portions that form the respective raised bases.

In some instances, mold cavity portions for the individual bases and the respective fastener elements are formed in a mold roll and the thermoplastic resin is introduced by forming a calendar nip with the mold roll and an adjacent pressure roll. Heated resin is introduced to the nip while the rolls turn together.

In some embodiments, mold cavities are formed as a series of cavities in the peripheries of a multiplicity of rings and the mold roll is assembled by a stack of rings in an axially aligned assembly. In one preferred form there are rings having flat sides adjacent to and forming the sides of mold cavities defined in other rings, whereby sides of the fastener elements and of the respective raised bases are coplanar.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1 is highly magnified side view of a small portion of a hook fastener component showing one individual raised base and individual fastener element while

FIG. 2 is a diagrammatic side view of an extruder and calender molding system for forming the fastener component of FIG. 1, while

FIG. 3, in respect of another embodiment, is a magnified side view of a small portion of a hook fastener component showing one individual raised base and individual fastener element while FIGS. 3A, 3B, and 3C are, respectively, side cross-section, plan and end cross sectional views on a magnified scale of a portion of the fastener component from which FIG. 3 was derived. FIG. 3D is a side view indicating dimensions of a portion of one row of raised bases and respective fastener elements.

FIG. 5, in respect of another embodiment, is a magnified side view of a small portion of a hook fastener component showing one individual raised base and individual fastener element while

DETAILED DESCRIPTION

Figure 1:
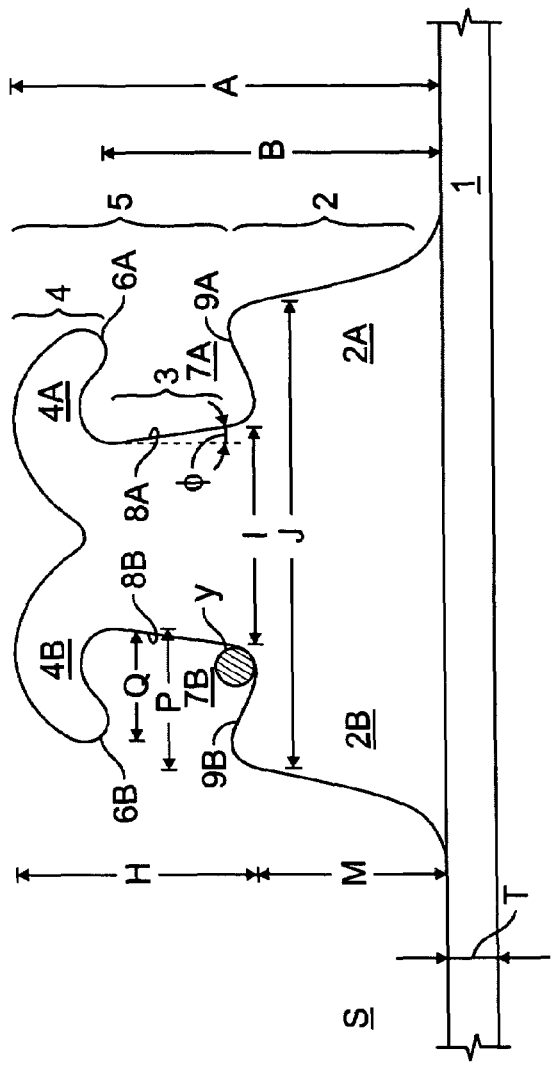
Figure 1A:
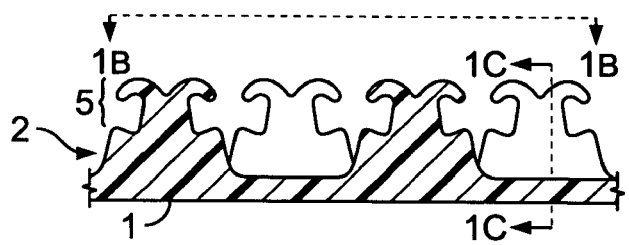
FIGS. 1A, 1B, and 1C are, respectively, side cross-section, plan and end cross sectional views on a magnified scale of a portion of the fastener component from which FIG. 1 was derived.
Figure 1C:
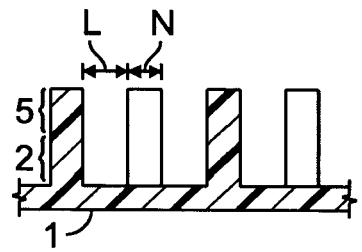
Figure 1B:
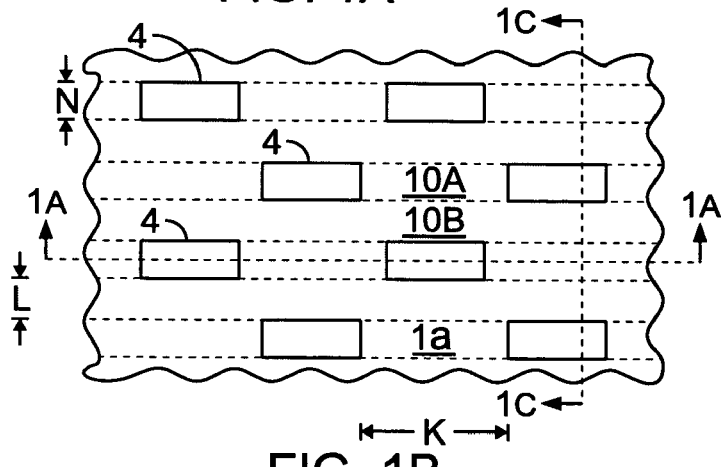
Figure 1D:
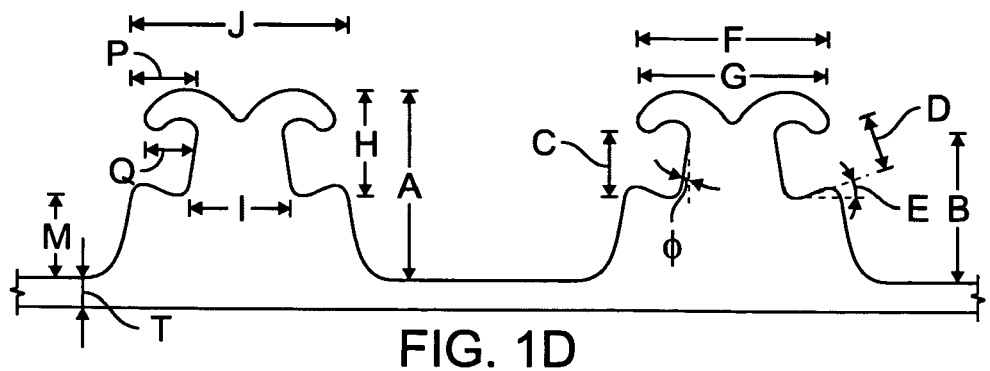
FIG. 1D is a side view indicating dimensions of a portion of one row of raised bases and respective fastener elements.

Referring first to general aspects of FIGS. 1-1D, a small part of a hook fastener component for hook and loop fastening is shown. It comprises a common portion, in this case a laterally-extending layer 1 of thermoplastic resin. Numerous individual, raised bases 2 rise from common layer 1 in a spaced apart pattern, see FIGS. 1A and 1B. In this embodiment, each individual raised base 2, at its upper, central region supports an individual fastener hook element 5. The common surface 1a of layer 1 lies distance A below the top of the fastener elements, defining the loop space S in which loops may reside. Fastener element 5 is comprised of a stem 3 and a head 4. The base 2 has contiguous raised base portions 2A and 2B that extend, respectively, in opposite lateral directions beyond the stem 3. The head 4 comprises two head portions 4A and 4B that project laterally in opposite directions, overhanging oppositely directed sides 8A and 8B of the stem 3 and defining loop regions 7A and 7B above the upper surfaces 9A and 9B of the base portions 2A and 2B. Each loop region 7A, 7B, thus has a substantially raised lower bound which improves the probability that loops entering under the overhanging head portions will be engaged by the tips 6A and 6B of the head. Furthermore, the relative shortness of the stem 3 in comparison to the elevation A of the head 4 (or elevation B of the head tips 6A, 6B) enables the fastener elements to have desirable lateral bending resistance both in the plane in which the tips lie (the plane of FIG. 1A) and in the orthogonal plane of FIG. 1C.

The highly magnified scale of the figures is evident from dimensions selected for preferred embodiments. For instance the thickness T of the common layer 1 of thermoplastic resin preferably ranges from about 0.001 inch to 0.005 inch, which may be self-supporting or laminated to the surface of another layer or member. The height M of the raised base 2 relative to the common portion is preferably between about 40 percent and 100 percent of the height H of the fastener element 5 above the raised base. The distance D between the tip 6A or 6B of the overhanging head portion and the nearest portion of the upper surface of the raised base, 9A, 9B, is preferably less than about 50 percent of the elevation B of the tip relative to the common portion 1 lying laterally beyond the raised base. Loop regions 7A and 7B are bounded by surfaces of the fastener element, 8A and 8B, and of the base, 9A and 9B. Preferably, these surfaces are shaped to position a part of the loop region laterally inwardly of the head tip 6A, 6B, toward the stem 3 at the base. The stem surface 8A, 8B, exposed to the loop region is preferably inclined at an angle Ø no more than about 30 degrees to perpendicular to the lateral direction. This locates the stem 3 at base 2 in a substantially laterally recessed relation to the tip 6A, 6B, of the head portion. The upper surface of an individual raised base is preferably positioned and shaped to deflect loops Y toward the stem of the fastener element when the hook component moves face-wise against a loop material. Preferably, the upper surface 9A, 9B, of the raised base is inclined downwardly in the direction of the respective stem 3 with an angle of inclination E between about 10 and 60 degrees relative to the lateral direction. In any event, it is preferred that the upper surface of a raised base, 9A, 9B, have at least a slight depression adjacent stem 3 in which a loop Y can reside, resistant to dislodgement by lateral shifting of the fastener components.

Preferably, the lateral extremity of the laterally contiguous portion of the raised base lies a distance P from the stem of the fastener that is no greater than 175 percent of the distance Q at which the tip of the portion of the head lies from the stem, so that tips 6A and 6B are laterally not far from the loop space S of maximum depth A. In preferred cases the extremity of the base lies at least slightly beyond the tip of the head.

With fastener elements having head portions projecting in two opposite lateral directions, e.g. of "palm tree" form, the width of the respective raised base is at least 60 percent wider than the width of the stem at the raised base.

Now referring to specific features of the embodiment of FIGS. 1-1D, the fastener element has oppositely projecting head portions, the height M of raised base 2 is 0.0054 inch and its width J is 0.014 inch. The height H of the fastener element is 0.0069 inch and the width G of its head is 0.0123 inch. In the case of choice of fastener thickness N of 0.004 inch and spacing L of 0.006 inch, the hook fastener component of this embodiment may have an areal density of individual fastener elements of 3,200 per square inch. The full set of specific dimensions for the embodiment of FIG. 1 (and of two other specific embodiments to be described) is given in the following table.

DIMENSIONS & RATIOS FOR SELECTED EMBODIMENTS

Figure 5A:
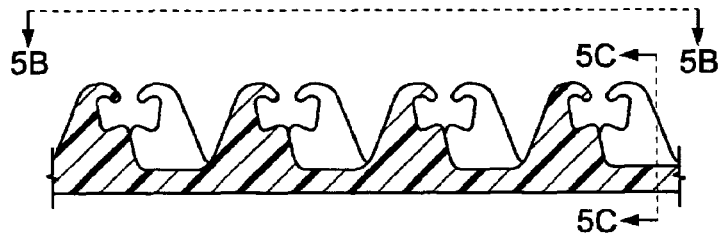
FIGS. 5A, 5B, and 5C are, respectively, side cross-section, plan and end cross sectional views on a magnified scale of a portion of the fastener component from which FIG. 5 was derived.
Figure 5C:
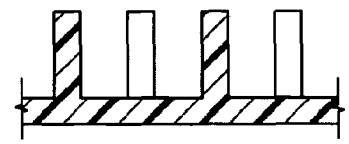
Figure 5B:
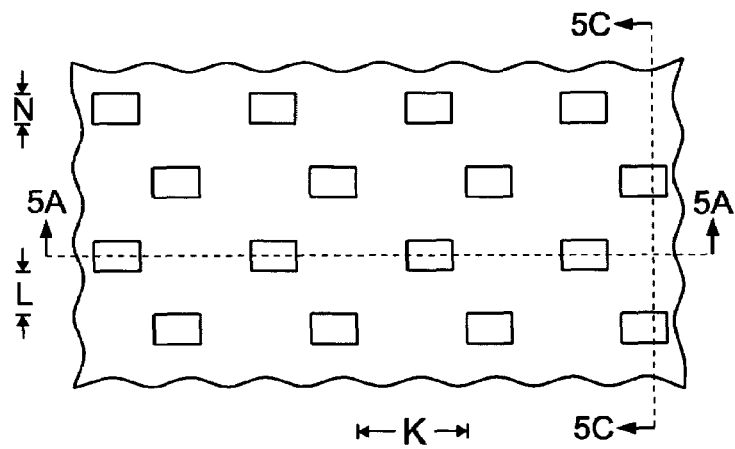
Figure 5:
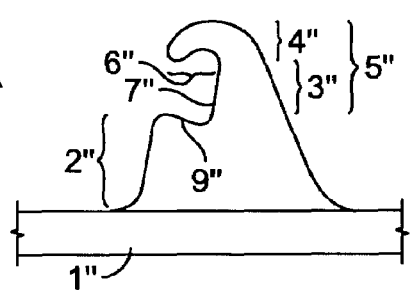

|  | Dimension | FIG. 1 | FIG. 3 | FIG. 5 |
|---|---|---|---|---|
| Overall Height, in. | A | 0.0123 | 0.0123 | 0.0123 |
| Tip elevation from common layer, in. | B | 0.0097 | 0.0097 | 0.0097 |
| Tip height from base (Loop region depth), in. | C | 0.0043 | 0.0043 | 0.0043 |

-continued

DIMENSIONS & RATIOS FOR SELECTED EMBODIMENTS

|  |  | FIG. 1 | FIG. 3 | FIG. 5 |
|---|---|---|---|---|
| Loop passage width, in. | D | 0.0036 | 0.0024 | 0.0036 |
| Angle of inclination | E | 24° | 45° | 24° |
| Width between base high points, in. | F | 0.0127 | 0.0145 | 0.0061 |
| Hook head width, in. | G | 0.0123 | 0.0123 | 0.006 |
| Fastener element height, in. | H | 0.0069 | 0.0069 | 0.0069 |
| Stem width at base, in. | I | 0.0065 | 0.0065 | 0.0044 |
| Base width, in. | J | 0.014 | 0.017 | 0.0084 |
| Head spacing in line, in. | K | 0.019 | 0.025 | 0.015 |
| Spacer plate thickness, in. | L | 0.006 | 0.006 | 0.006 |
| Base height (A-H), in. | M | 0.0054 | 0.0054 | 0.0054 |
| Mold ring thickness, in. | N | 0.004 | 0.004 | 0.004 |
| Hooks/in$^2$. |  | 3200 | 2710 | 5000 |
| Protrusion of raised, in. base beyond head tip, in. | P | 0.0042 | 0.0057 | 0.0042 |
| Width of head overhang beyond stem, in. | Q | 0.0034 | 0.0034 | 0.0034 |
| Percentage coverage by Footprint percent |  | 15.7 | 13.3 | 12.0 |
| RATIOS |  |  |  |  |
| Loop Region D/tip elevation | C/B | 0.44 | 0.44 | 0.44 |
| Base height v. hook height | M/H | 0.78 | 0.78 | 0.78 |
| Base height v. overall height | M/A | 0.44 | 0.44 | 0.44 |
| Base width excess v. head width | (F-G)/G | 0.03 | 0.18 | 0.02 |
| Passage width v. loop filament diameter of 0.001 inch | D/Loop Dia | 3.6 | 2.4 | 3.6 |
| Stem width at base v. base width | I/J | 0.46 | 0.38 | 0.52 |
| Head spacing v. head width | K/G | 1.58 | 1.54 | 2.50 |
| Base width v. stem width | J/I | 2.15 | 2.65 | 1.91 |
| Base protrusion v. head overhang | P/Q | 1.24 | 1.68 | 1.24 |

In a preferred embodiment, as indicated in FIG. 1A, the base 2 is formed of the same resin as, and integrally with, common layer 1. The hook fastener element 5 is formed of the same resin as, and integrally with, the base 2, from the upper part of which it extends. Typical resins include polypropylene, polyethylene and nylon. In this embodiment, whereas the stem, centered on the raised base, has a width I of 0.0065 inch adjacent the base, the raised base has width J of 0.014 inch, with equal contiguous base portions 2A and 2B extending beyond the two sides 8A and 8B of stem 3. Portions 2A and 2B lie under the overhanging head portions 4A and 4B, and have upper surfaces 9A and 9B forming the lower bounds of loop regions 7A and 7B. As shown, the upper surface is highest near its outer extremities, forming restricted passages of width D of 0.0036 inch with the tips of the respective head portions. From there the upper surfaces 9A and 9B of the raised base are inclined downwardly, inwardly toward the stem 3, at angle E of 24° to the lateral direction (horizontal direction in the figure). Thus a depression is formed at the stem providing a region for loop Y, FIG. 1 to lie against the stem, in position laterally recessed from the tip 6B of the overhanging head 4B.

The embodiment of FIG. 1 is constructed to be formed by calender molding although other molding or forming techniques are possible for this form of hook component or a form suitably modified to accommodate the technique. Other techniques include injection molding into a fixed mold array, molding preforms followed by post-molding operations, and the extruding, cutting and stretching technique, each of which is described in the literature.

Figure 2:
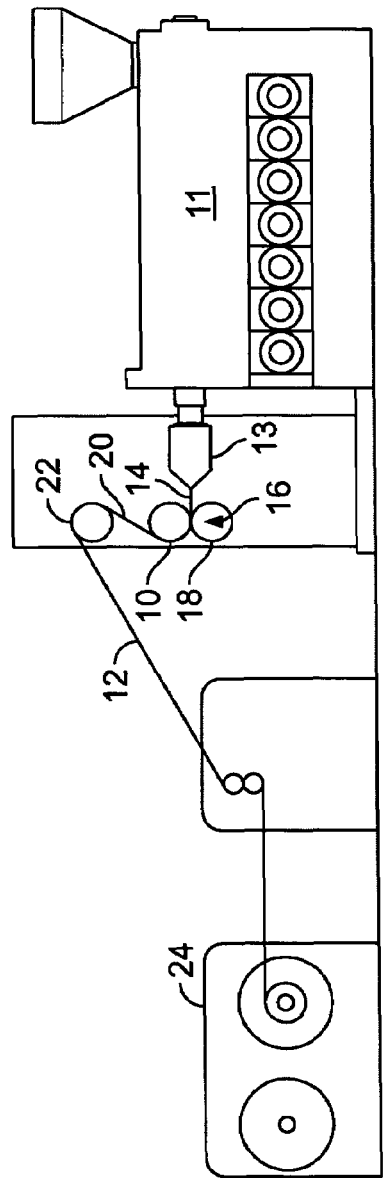

For producing the hook component of FIG. 1 by calender molding, referring to FIG. 2, an extruder 11 terminating in a slot-form die 13 extrudes a sheet of molten thermoplastic resin 14. The resin while moldable is lead into calender nip 16 formed between cooled mold roll 10 and pressure roll 18. The gap between rolls 10 and 18 sets the thickness T of the common layer 1 of thermoplastic, formed on the surface 10B of mold roll 10, see FIG. 2A. Mold cavities 10C formed in a pattern in the body of the mold roll have cavity portions defining the individual raised bases 2 and contiguous, deeper cavity portions shaped to form the fastener elements 5. The pressure of the calender nip ensures mold filling and production of an integrated structure, see FIG. 2B. The common layer 1, the pattern of individual raised bases 2, and the individual fastener elements 5 rising from mid regions of the raised bases are formed of thermoplastic resin that is continuous throughout the structure.

Following the nip 16, the thermoplastic continues on the cooled mold roll 10 until its form is set by cooling. Then, as a running web 20, it is pulled from the mold roll, led over further rolls indicated diagrammatically at 22, and as a finished web, 12, led to winder 24 or other processing station.

In this embodiment it will be noted that the mold cavities are fixed, i.e. there are no relatively moving parts. For demolding, the overhanging head portions 4A, 4B of the fastener are temporarily deformed. An advantage of the design shown is that during withdrawing, as soon as the heads reach the enlarged mold portions for the raised bases, the deformation forces are relieved and head portions 4A, 4B, are thus quickly freed to allow elastic forces to return them toward their molded form. The quickness with which this occurs improves the degree of return.

Figure 2A:
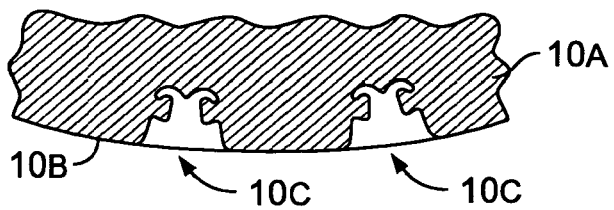
FIG. 2A is a broken away portion, in cross-section, on highly magnified scale, of a mold ring useful in the assembly of the mold roll of FIG. 2
Figure 2B:
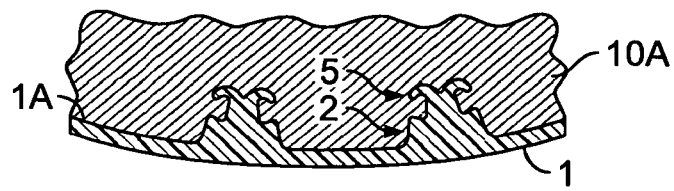
FIG. 2B is a view similar to FIG. 2A depicting thermoplastic resin applied to the mold ring by the apparatus of FIG. 2 during the course of molding the fastener component.

As suggested in FIGS. 1B and 2A, in its preferred form, the mold roll comprises an axially aligned stack of alternating mold rings 10A and spacer rings 10B, each of which has planar radial faces. The face-to-face assembly of mold rings and spacer rings defines at the peripheries of the rings a cylindrical, exterior calender surface, which imparts the upper common surface 1A to the finished product, see FIGS. 1B and 2A. Each mold ring 10A, wherever a formation is desired, has a mold cavity 10C formed in its peripheral region. In a preferred form this cavity extends through the thickness of the mold ring 10A. In the assembly, this mold cavity is closed on each side by the planar radial faces of adjacent rings. For further information concerning such mold rolls and the calender molding technique, see U.S. Pat. Nos. 4,872,243 and 5,260,015, the entire contents of each of which is hereby incorporated by reference.

The embodiment of FIGS. 3-3D is similar to that of FIG. 1. Individual raised bases 2' rise from common portion 1'. The hook fastener elements 5' are of identical form to those of FIG. 1. The bases 2', however, are wider than in FIG. 1, such that the highest regions 2'C of the bases are spaced apart distance F=0.0145 inch, exceeding the width G of the head by 0.0022 inch, and thus positioned beyond the tips 6'A and 6'B of the head. Also the upper surfaces 9'A and 9'B of the base are inclined at angle E of 45 degrees, steeper than in FIG. 1, and resulting in a deeper depression adjacent the stem. Because the elevation M of the recess next to the stem in each case is the same, M=0.0054 inch, the tip-to-base-surface dimension D is less in the embodiment of FIG. 3, i.e. D=0.024 inch. The full set of dimensions for this specific embodiment is given in the preceding table.

Figure 4:
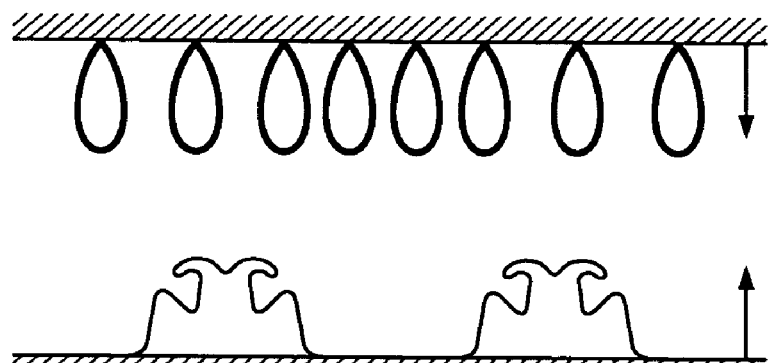
FIGS. 4, 4A and 4B are diagrammatic views of three stages of a hook fastener component engaging a loop fastener component.
Figure 4A:
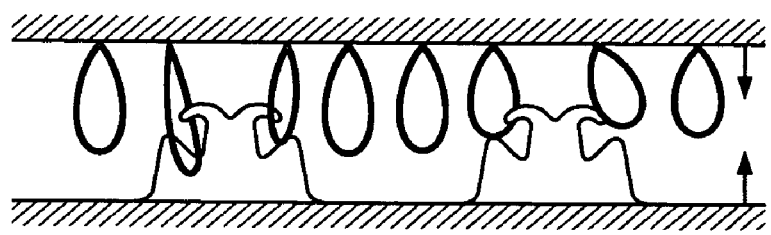
Figure 4B:
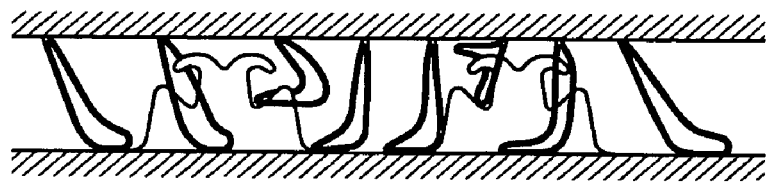

As indicated in FIG. 3B, the excess of base width F over head width G causes inwardly sloped outer portions 2'C of the raised base to directly encounter loops, as indicated in FIG. 3, when the hook and loop components are moved faces-wise together. This relative motion is indicated by arrow in FIG. 3. As a result of the incline of upper surface 9'A in the embodiment of FIG. 3, further relative motion of the surface X of the loop component to the dashed line position can result in a loop being diverted to the dashed line diagrammatic position, in which the head of the fastener element is engaged within the loop. Such actions are further diagrammed in the sequence FIGS. 4, 4A and 4B.

Although the specific form of loops in commercial products may take many forms, and involve a considerable amount of irregularity and randomness, similar directing and diverting effects can occur with such products, to increase the likelihood of a given fastener element engaging a loop.

Figure 5D:
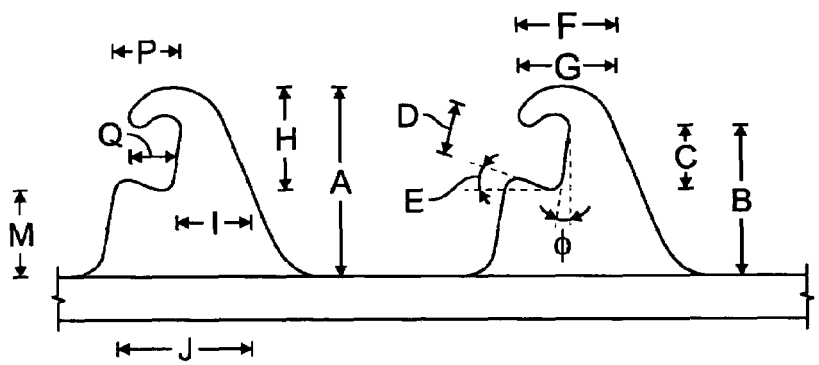
FIG. 5D is a side view indicating dimensions of a portion of one row of individual raised bases and respective individual fastener elements Like reference symbols in the various drawings indicate like elements.

FIGS. 5-5D are views similar to those of FIGS. 1-1D for a pattern of individual raised bases supporting individual "J" form fastener hook elements 5". These are fastener elements having single head portions. In preferred embodiments, in the plane of the overhanging head portion of each fastener element, the width J of the respective raised base is at least 45 percent wider than the width I of the stem at the raised base. The extra width of the base lies beneath the head overhang 6", and serves both to form a raised lower bound for the loop region 7", and forming a bend-resistant base for the fastener element 5". The lateral extent of the portion of the base relative to the J-form head may be the same as in FIG. 1 or FIG. 3, for example. The specific embodiment of FIG. 5 is most similar to that of FIG. 1.

In preferred embodiments in which fastener strength is desired in opposite directions, adjacent rows of J-form fastener elements have overhanging head portions projecting over their respective raised bases in opposite directions. Such an arrangement is shown in FIGS. 5A, B and C.

The full set of dimensions for this specific embodiment is given in the preceding table. As with the embodiments of FIGS. 1 and 3, the embodiment of FIG. 5 can be manufactured by the calender molding system described, with similar advantages, or by other techniques such as those mentioned.

In general, in forms preferred for use with nonwoven loop materials, such as formed with fibers of diameter of the order of 0.001 inch, the height H of the fastener elements 5, 5', 5" is less than about 0.015 inch, often less than 0.010 inch.

Also, in general, it is preferred for the projected area of the fastener elements of a hook component to occupy between about 10 percent and 25 percent of the respective area of the component. When using the calender molding technique, the spacing K of the fastening elements in the machine direction is selected at the time of forming the mold rings. After forming a set of mold rings of given thickness and element spacing, the fastener element density can still be varied by selection of the thickness L of the spacer rings disposed between adjacent mold rings, which determines the cross-machine spacing of the formations.

A number of embodiments of the invention have been described. Nevertheless, it will be understood that many modifications may be made without departing from the spirit and scope of the invention. Some examples follow. Mold cavities for the raised bases and fastener elements may be formed through only a partial thickness of a mold ring, so that the mold cavity is open on only one radial side of the ring, where it is closed by the flat surface of an adjacent ring in the assembly, the adjacent ring being another mold ring or a spacer ring. Each mold cavity may instead be formed by mating mold portions in two face-to-face plates. Rather than a finished molded fastener element, a molded preform member may be formed having raised bases and stems protruding from portions of these bases. The stems, i.e. so-called "preform" elements, may be of straight or inclined form, or have multiple branches, for instance diverging branches extending slightly in opposite directions from the vertical axis of the stem. After molding, the stems may be subjected to a post-molding operation in which a heated roll or other heating or shaping device causes the outer resin portions of the stems to form one or more head portions overlying the stem, and at least part of which overlies a portion of the raised base, to serve functions as have been described. Similarly, for use of the cut-and-stretch forming technique, an extrusion, for instance having multiple extruded formations of the profiles of FIG. 1A, 3A or 5A, joined by a common layer, may be formed and subjected to cut and stretch action. In another case an injection mold formed of a series of mold and spacer plates may form the fastener component integrally with a common surface of a larger object being injection molded. Other manufacturing techniques and specific forms of the various features are of course possible. Accordingly, other embodiments are within the scope of the following claims.

What is claimed is:

1. A hook component for hook and loop fastening, comprising a laterally-extending common portion of thermoplastic resin having a pattern of individual, substantially raised bases distributed over an area of the common portion and comprised of thermoplastic resin integral with resin of the common portion, each raised base carrying an individual fastener element and being spaced laterally from other raised bases and their fastener elements such that loop space extending to the common portion substantially surrounds each raised base and its fastener element, each fastener element formed of thermoplastic resin integral with resin of the respective raised base and comprising an upwardly projecting stem and a head that is joined to the stem, the head extending laterally beyond the stem in at least one direction to provide a loop-engageable overhanging portion that ends in a tip, wherein the lower end of the stem and the respective raised base are portions of a single, seamless mass of resin, a substantial, laterally contiguous portion of an upper surface of the raised base lying beneath the overhanging portion of the respective head, forming a lower bound to a loop region lying immediately beneath the overhanging portion of the fastener element, wherein the upper surface of each raised base defines at least a slight depression adjacent the respective stem.

2. The hook component of claim 1 in which the height of each raised base relative to the common portion is between about 40 percent and 100 percent of the height of the respective fastener element above its raised base.

3. The hook component of claim 1 in which the distance between the tip of each overhanging head portion and a nearest portion of the upper surface of each respective raised base is less than about 50 percent of the elevation of the tip relative to the common portion that lies laterally beyond the raised base.

4. The hook component of claim 1 in which the surfaces of each fastener element and each raised base are shaped to position a part of the loop region laterally inwardly of the tip toward the stem.

5. The hook component of claim 4 in which the surface of each stem exposed to the loop region is inclined no more than about 30 degrees to perpendicular to the lateral direction, locating the stem in a substantially laterally recessed relation to the tip of the head portion.

6. The hook component of claim 1 in which the upper surface of each raised base is inclined downwardly in the direction of the respective stem.

7. The hook component of claim 6 in which the upper surface of each raised base is inclined downwardly in the direction of the respective stem with an angle of inclination between about 10 and 60 degrees relative to the lateral direction.

8. The hook component of claim 1 in which each raised base and the stem supported by it are of molded thermoplastic resin.

9. The hook component of claim 8 in which the head and stem of each fastener element are of molded thermoplastic resin.

10. The hook component of claim 1 in which, as a result of being molded in a mold cavity closed on opposite sides by planar surfaces, the stem of each fastener element and the respective raised base have co-planar side surfaces.

11. The hook component of claim 1 in which overhanging head portions of each fastener element project substantially in two opposite lateral directions and in which each overhanging portion overlies a portion of the respective raised base, raised upper surfaces of these portions of the raised base forming lower bounds to loop regions lying below the overhanging head portions of the fastener element.

12. The hook component of claim 11 in which the fastener elements are substantially of molded palm tree form.

13. The hook component of claim 11 in which, in the plane of the overhanging head portion of each fastener element, the width of the respective raised base is at least 60 percent wider than the width of the stem at the raised base.

14. The hook component of claim 1 in which each fastener element has only one overhanging head portion.

15. The hook component of claim 14 comprised of adjacent rows of the fastener elements, the fastener elements of one row having overhanging head portions all of which project over portions of their respective raised bases in one lateral direction and the fastener elements of an adjacent row having overhanging head portions all of which project over portions of their respective raised bases in the opposite lateral direction.

16. The hook component of claim 14 in which, in the plane of the overhanging head portion of each fastener element, the width of the respective raised base is at least 45 percent wider than the width of the stem at the raised base.

17. The hook component of claim 1 having a loop material-penetrating profile defined substantially entirely by the heads of the fastener elements, the area of the heads occupying between about 10 percent and 25 percent of the respective area of the hook component.

18. A hook component for hook and loop fastening, comprising a laterally-extending common portion of thermoplastic resin, a pattern of individual, substantially raised bases distributed over an area of the common portion and comprised of thermoplastic resin integral with resin of the common portion, each raised base carrying an individual fastener element and being spaced laterally from other raised bases and their fastener elements such that loop space extending to the common portion substantially surrounds each raised base and its fastener element, each fastener element formed of thermoplastic resin integral with resin of the respective raised base and comprising an upwardly projecting stem and a head that is joined to the stem, the head extending laterally beyond the stem in at least one direction to provide a loop-engageable overhanging portion that ends in a tip, the lower end of the stem joined to one portion of the respective raised base such that the lower portion of the stem and the respective raised base form portions of a single, seamless mass of resin, a substantial, laterally contiguous portion of the raised base lying beneath the overhanging portion of the respective head, forming a lower bound to a loop region lying immediately beneath the overhanging portion of the fastener element, the height of the raised base relative to the common portion being between about 40 and 100 percent of the height of the respective fastener element above its raised base, the surfaces of the fastener element and the raised base being shaped to position a part of the loop region laterally inwardly of the tip toward the stem, overhanging head portions of the fastener element projecting substantially in two opposite lateral directions, each overhanging head portion overlying a portion of the respective raised base, raised upper surfaces of these portions of the raised base forming lower bounds to loop regions lying below the overhanging head portions of the fastener element and, in the plane of the overhanging head portion of the fastener element, the width of the respective raised base being at least 60 percent wider than the width of the stem at the raised base.

19. A hook component for hook and loop fastening, comprising a laterally-extending common portion of thermoplastic resin, a pattern of individual, substantially raised bases distributed over an area of the common portion and comprised of thermoplastic resin integral with resin of the common portion, each raised base carrying an individual fastener element and being spaced laterally from other raised bases and their fastener elements such that loop space extending to the common portion substantially surrounds each raised base and its fastener element, each fastener element formed of thermoplastic resin integral with resin of the respective raised base and comprising an upwardly projecting stem and a head that is joined to the stem, the head extending laterally beyond the stem in at least one direction to provide a loop-engageable overhanging portion that ends in a tip, the lower end of the stem joined at a root region to one portion of the respective raised base such that the lower portion of the stem and the respective raised base form portions of a single, seamless mass of resin, a substantial, laterally contiguous portion of the raised base lying beneath the overhanging portion of the respective head, forming a lower bound to a loop region lying immediately beneath the overhanging portion of the fastener element, the height of the raised base relative to the common portion being between about 40 and 100 percent of the height of the respective fastener element above its raised base, the surfaces of the fastener element and the raised base being shaped to position a part of the loop region laterally inwardly of the tip toward the stem, the fastener element having only one overhanging head portion, and in the plane of the overhanging head portion of the fastener element, the width of the respective raised base being at least 45% wider than the width of the stem at the raised base.

20. The hook component of claim 1, 18 or 19, in which the fastener elements are less than about 0.015 inch in height above their respective raised bases.

21. The hook component of claim 1, 18 or 19, in which the fastener elements are less than about 0.010 inch in height above their respective raised bases.

22. The hook component of claim 1, 18 or 19 in which a lateral extremity of a laterally contiguous portion of the raised base lies a distance from the stem of the fastener no greater than 175 percent of the distance at which the tip of the overhanging head portion lies from the stem.

23. A hook component for hook and loop fastening, comprising a laterally-extending common portion with a pattern of individual, substantially raised bases distributed over an area of the common portion, each raised base carrying an individual fastener element and being spaced laterally from other raised bases and their fastener elements such that loop space extending to the common portion substantially surrounds each raised base and its fastener element, each fastener element comprising an upwardly projecting stem and a head that is joined to the stem, the head extending laterally beyond the stem in at least one direction to provide a loop-engageable overhanging portion that ends in a tip, the lower end of the stem joined to one portion of the respective raised base such that the lower portion of the stem and the respective raised base form portions of a single, seamless mass of resin, a substantial, laterally contiguous portion of the raised base lying beneath the overhanging portion of the respective head, forming a lower bound to a loop region lying immediately beneath the overhanging portion of the fastener element, the contiguous portion of the raised base extending laterally beyond both the stem and the overlying head portion of its respective fastener element to a lateral extremity, the lateral extremity of the raised base lying a distance from the stem of the fastener no greater than 175 percent of the distance at which the tip of the overlying head portion lies from the stem.

24. The hook component of claim 1, 18, or 19 in which lateral extremities of the raised bases extend laterally beyond the tips of the overhanging head portions of their respective fastener elements.

25. A hook component for hook and loop fastening, comprising a laterally-extending common portion of thermoplastic resin having a pattern of individual, substantially raised bases distributed over an area of the common portion and comprised of thermoplastic resin integral with resin of the common portion, each raised base carrying an individual fastener element and being spaced laterally from other raised bases and their fastener elements such that loop space extending to the common portion substantially surrounds each raised base and its fastener element, each fastener element formed of thermoplastic resin integral with resin of the respective raised base and comprising an upwardly projecting stem and a head that is joined to the stem, the head extending laterally beyond the stem in at least one direction to provide a loop-engageable overhanging portion that ends in a tip, wherein the lower end of the stem and the respective raised base are portions of a single, seamless mass of resin, a substantial, laterally contiguous portion of an upper surface of the raised base lying beneath the overhanging portion of the respective head, forming a lower bound to a loop region lying immediately beneath the overhanging portion of the fastener element, the surfaces of each fastener element and each raised base being shaped to position a part of each loop region laterally inwardly of the respective tip toward the respective stem.

26. The hook component of claim 25 in which the surface of each stem exposed to the loop region is inclined no more than about 30 degrees to perpendicular to the lateral direction, locating the stem in a substantially laterally recessed relation to the tip of the respective head portion.

27. A hook component for hook and loop fastening, comprising a laterally-extending common portion of thermoplastic resin having a pattern of individual, substantially raised bases distributed over an area of the common portion and comprised of thermoplastic resin integral with resin of the common portion, each raised base carrying an individual fastener element and being spaced laterally from other raised bases and their fastener elements such that loop space extending to the common portion substantially surrounds each raised base and its fastener element, each fastener element formed of thermoplastic resin integral with resin of the respective raised base and comprising an upwardly projecting stem and a head that is joined to the stem, the head extending laterally beyond the stem in at least one direction to provide a loop-engageable overhanging portion that ends in a tip, wherein the lower end of the stem and the respective raised base are portions of a single, seamless mass of resin, a substantial, laterally contiguous portion of an upper surface of the raised base lying beneath the overhanging portion of the respective head, forming a lower bound to a loop region lying immediately beneath the overhanging portion of the fastener element, with the upper surface of each raised base inclined downwardly in the direction of the respective stem.

28. The hook component of claim 27 in which the upper surface of each raised base is inclined downwardly in the direction of the respective stem with an angle of inclination between about 10 and 60 degrees relative to the lateral direction.

* * * * *